US008048567B2

(12) United States Patent
Kim et al.

(10) Patent No.: US 8,048,567 B2
(45) Date of Patent: Nov. 1, 2011

(54) ANODE FOR SECONDARY BATTERY HAVING NEGATIVE ACTIVE MATERIAL WITH NANO-FIBER NETWORK STRUCTURE AND SECONDARY BATTERY USING THE SAME, AND FABRICATION METHOD OF NEGATIVE ACTIVE MATERIAL FOR SECONDARY BATTERY

(75) Inventors: Il-Doo Kim, Seoul (KR); Jae-Min Hong, Seoul (KR); Seong-Mu Jo, Seoul (KR)

(73) Assignee: Korea Institute of Science and Technology (KR)

( * ) Notice: Subject to any disclaimer, the term of this patent is extended or adjusted under 35 U.S.C. 154(b) by 0 days.

(21) Appl. No.: 12/112,423

(22) Filed: Apr. 30, 2008

(65) Prior Publication Data

US 2008/0274403 A1    Nov. 6, 2008

(30) Foreign Application Priority Data

May 4, 2007    (KR) .................. 10-2007-0043722

(51) Int. Cl.
*H01M 4/58* (2010.01)
*H01M 4/62* (2006.01)

(52) U.S. Cl. ............. 429/231.5; 429/209; 977/948
(58) Field of Classification Search ............. 429/218.1
See application file for complete search history.

(56) References Cited

U.S. PATENT DOCUMENTS

| 6,558,847 B1* | 5/2003 | Kawakami et al. ....... 429/231.95 |
| 2002/0061446 A1* | 5/2002 | Gan et al. ............... 429/231.8 |
| 2004/0126649 A1* | 7/2004 | Chen et al. .................. 429/58 |
| 2004/0131934 A1* | 7/2004 | Sugnaux et al. ............. 429/209 |

* cited by examiner

*Primary Examiner* — Ula C. Ruddock
*Assistant Examiner* — Patricia Davis
(74) *Attorney, Agent, or Firm* — Ostrolenk Faber LLP

(57) ABSTRACT

There is provided a metal oxide having a continuous nano-fiber network structure as a negative active material for a secondary battery. A method for fabricating such negative active material for a secondary battery comprises spinning a mixed solution of a metal oxide precursor and a polymer onto a collector to form composite fibers mixed with the metal oxide precursor and the polymer, thermally compressing or thermally pressurizing the composite fibers, and thermally treating the thermally compressed or thermally pressurized composite fibers to remove the polymer from the composite fiber.

6 Claims, 14 Drawing Sheets

ANODE FOR SECONDARY BATTERY HAVING NEGATIVE ACTIVE MATERIAL WITH NANO-FIBER NETWORK STRUCTURE AND SECONDARY BATTERY USING THE SAME, AND FABRICATION METHOD OF NEGATIVE ACTIVE MATERIAL FOR SECONDARY BATTERY

TECHNICAL FIELD

The present invention relates to an anode for a secondary battery having a negative active material with a nano-fiber network structure and a secondary battery using the same, and to a fabrication method of a negative active material for a secondary battery.

BACKGROUND ART

Recently, electronic devices (e.g., MP3 players, digital cameras, mobile phones, digital camcorders, PDAs, notebooks, and the like) are being made smaller in size for being more easily carried. With such trend, studies on a secondary battery as a source of power supply capable of being smaller and lighter for being more easily carried and more durable, in particular, a Li-secondary battery, have been steadily progressing. For such source of power supply, if a battery as a thin layer having a thickness of a few tens of nm to a few μm can be integrated inside of a micro device, it can be widely used in various fields such as MEMS (Micro Electro Mechanical System), micro robotics, micro sensors, and the like as well as in portable devices.

Meanwhile, considering the depletion of petroleum resources, environmental pollution, etc., many efforts have been continuously made towards replacing existing internal combustion engine automobiles with electric vehicles (EV) or hybrid electric vehicles (HEV). For this, there is a need for a battery having a high power density, excellent stability and low cost.

A battery includes a cathode, an anode, an electrolyte and a separator. Among these, the active material of each of the cathode and the anode is the most influential factor on battery characteristics.

In general, for a cathode material of a lithium secondary battery, J. B. Goodenough et al. (US) introduced a design using a $LiCoO_2$ positive active material having a layered structure in 1980. Since then, the cathode material of the lithium secondary battery was first commercialized by SONY (Japan) in 1991 and is widely used till now.

There are various materials for the anode, such as lithium metal, a lithium metal alloy, a carbon material, silicon, tin oxide, a transition metal oxide, and the like. However, a carbon material which is low in potential change with respect to an intercalation and emission reaction of lithium and has an excellent reversibility, has become commercialized.

However, the carbon material (graphite) currently being commercialized and used intercalates one lithium atom per 6 carbon atoms ($LiC_6$) in theory, limiting the theoretical maximum capacity to 372 mAh/g and thus limiting an increase in its capacity.

In addition to the carbon material, when lithium is used, a high capacity can be implemented due to a high energy density. However, dendrite formation due to the strong reducing power of lithium causes problems related to stability. Due to the intercalation and deintercalation processes of lithium, cycling characteristics are greatly reduced.

Silicon, tin or alloys thereof are being studied as alternatives. Silicon undergoes a reversible reaction with lithium through a compound formation reaction with lithium and has a theoretical maximum capacity of 4200 mAh/g, which is a greatly higher value compared to that of a carbon-based material. Further, tin oxide also has a high theoretical capacity (bulk $SnO_2$, 1494 mAh/g). However, a very great volume change of 200-350% occurs due to a reaction with lithium when charging/discharging, thereby causing the separation of the negative active material from the collector during repetitive charging/discharging cycles or deteriorating the cycling characteristics due to an increase in resistance according to the change in contact interface among the negative active materials.

To overcome these problems, Korean Laid-Open Patent Publication No. KR10-2007-0005149 disclosed a tin-based nano-powder capped with a monomer which is used as a negative active material for a secondary battery of high efficiency, showing excellent cycling characteristics. However, expensive nano-powder of 10 nm-300 nm should be used and organic coating is needed, thereby entailing high fabrication cost and making the process complicated.

Further, Korean Laid-Open Patent Publication No. KR10-2005-0087609 disclosed that when a small amount of $SnO_2$ is added into carbon powder used as an anode material of a conventional lithium secondary battery, high reversibility and excellent cycling characteristics were obtained. However, it was observed that the cycling characteristics were progressively reduced after 10 charging/discharging cycles.

Further, in order to minimize such volume changes and obtain high capacity values, studies on growing a $SnO_2$ nanowire by a thermal evaporation of metal Sn have been made by Z. Ying et al. [Characterization of $SnO_2$ nanowires as an anode material for Li ion-batteries, Applied Physics Letters, 87, 113108, 2005]. However, a significant amount of capacity decay from 1250 mAh/g to 700 mAh/g was observed from the $2^{nd}$ cycle to the $15^{th}$ cycle.

Recently, interest is highly increased in electrospinning as a fabrication method of a functional nano-fiber. Nano-fibers fabricated by electrospinning have a high porosity and an enhanced surface to volume ratio thus to be expected to have enhanced physical properties. However, in the case of a metal oxide/polymer composite fiber obtained by electrospinning, while polymers are decomposed, in a thermal treatment process at a high temperature of more than 450° C., it is observed that a rapid volume contraction is accompanied and cracking or separation from a lower substrate on which the composite fiber is formed occurs.

Accordingly, when a metal oxide such as $SnO_2$ is used as a negative active material, there is a need for a composition with a metal oxide having a new structure which can minimize a volume change when charging/discharging and highly enhance the cycling characteristics. Also, there is required a composition with a metal oxide which can be applied to a thin film or a thick film with comparatively low cost processes and rapid yield. Further, by increasing adhesion with the substrate, enhancement of stability and high output density can be obtained. Accordingly, a next generation negative active material having a high possibility of commercialization needs to be developed by highly improving the "rate performance" which is considered to be a weakness of common negative active materials.

DISCLOSURE OF THE INVENTION

Technical Problem

To overcome these problems and in accordance with the purpose of the present invention, as embodied and broadly described herein, there is provided a negative active material having a high initial discharge capacity and charge capacity by a greatly increased surface area (reactive area) and having meso-pores, and a fabrication method thereof.

Another object of the present invention is to provide a negative active material which can maximize cycling characteristics by minimizing volume expansion and contraction of the negative active material occurring during charging/discharging and which can perform high speed charging/discharging and high power (high C-rate), and a fabrication method thereof.

Another object of the present invention is to provide an anode for a secondary battery having high mechanical, thermal and electrical stabilities by highly increasing the adhesion between a negative active material and a collector.

Technical Solution

To achieve these and other advantages and in accordance with an aspect of the present invention, there is provided an anode for a secondary battery, comprising: an anode collector, and a negative active material compressed on at least one surface of the collector and being a thin porous metal oxide layer with a network structure of nano-fibers composed of at least one of nano-grains, nano-rods, and nano-particles.

There is also provided a secondary battery, comprising: an anode having an anode collector and a negative active material compressed on at least one surface of the collector, an electrolyte and a cathode, wherein the negative active material is a thin porous metal oxide layer with a network structure of nano-fibers composed of at least one of nano-grains, nano-rods, and nano-particles.

There is further provided a fabrication method of a negative active material for a secondary battery, comprising: spinning a mixed solution of a metal oxide precursor and a polymer onto a collector to form composite fibers mixed with the metal oxide precursor and the polymer, thermally compressing or thermally pressurizing the composite fibers, and thermally treating the thermally compressed or thermally pressurized composite fibers to remove the polymer from the composite fibers.

MODES FOR CARRYING OUT THE PREFERRED EMBODIMENTS

Figure 1:
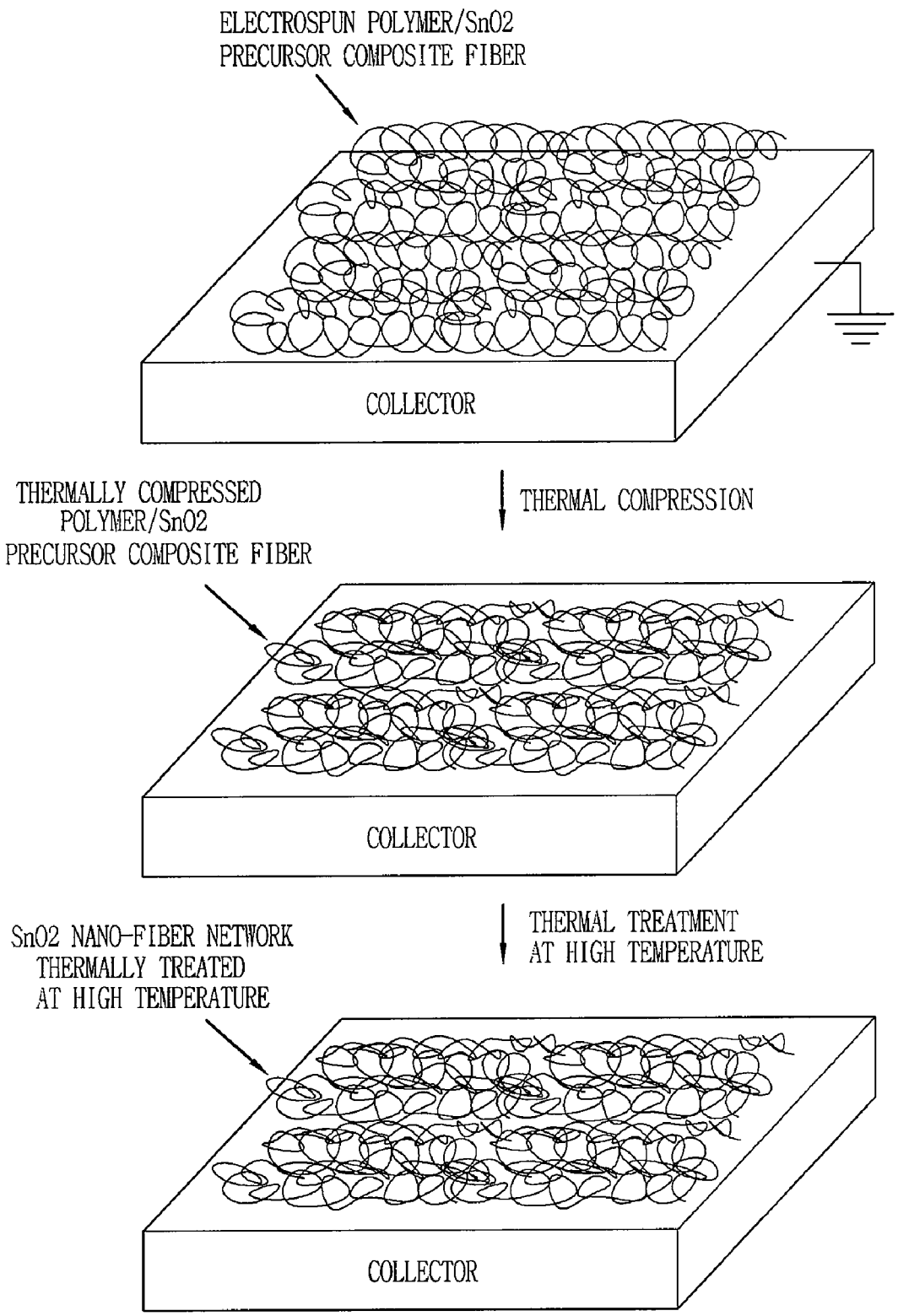
FIG. 1 is a schematic view illustrating the sequence of a fabrication process of a negative active material for a secondary battery according to the present invention.

FIG. 1 is a schematic view of the sequence of a fabrication method of a negative active material for a secondary battery according to the present invention.

Referring to FIG. 1, a solution mixed of a metal oxide precursor, e.g., tin oxide precursor (tin acetate), a polymer (PVAc) and a solvent (DMF) is prepared, and then is spun onto an anode collector to form ultrafine fibrous tin oxide precursor/polymer composite fibers through phase separation between the tin oxide precursor and the polymer or through mutual mixture.

Next, while contact portions or contact areas on the fibers are enlarged through thermal compression or thermal pressurization of the composite fibers (in this case, if the polymer can be induced to be partially or entirely melted, only heating at a temperature slightly higher than a glass transition temperature without compression may be included), the polymer is partially or entirely melted, thereby increasing the adhesion with the collector. Here, to control the rapid volatilization of the polymer, a thermal treatment at a higher temperature can be performed after step-by-step thermal treatments at a lower temperature (100° C., 200° C.).

Then, the polymer material is removed from the composite fibers through the thermal treatment, resulting in obtaining a thin layer of a tin oxide nano-fiber network.

This negative active material for a secondary battery, as a thin porous metal oxide layer, is compressed on at least one surface of the anode collector and has a nano-fiber network structure composed of at least one of nano-grains, nano-rods, and nano-particles. Accordingly, its surface area and reactive area are maximized, and adhesion between the thin metal oxide layer and the collector is markedly enhanced. Here, nano-grains mean nano-meter sized grains. In general, nano-grains have a specific crystalline structure. Nano-rods have width and length size distribution of 5-20 nm and 30-100 nm, respectively. Nano-particles mean nano-meter sized particles. Nano-particles can be composed of single, polycrystalline, and amorphous structure. Nano-particles can be composed of a number of nano-grains.

In addition to $SnO_2$, metal oxides usable as a negative active material may include $TiO_2$, $Fe_2O_3$, $Fe_3O_4$, $CoO$, $Co_3O_4$, $CuO$, $ZnO$, $In_2O_3$, $NiO$, $MoO_3$, $WO_3$, and the like.

Further, materials for the collector may be Pt, Au, Pd, Ir, Ag, Rh, Ru, Ni, stainless steel, Al, Mo, Cr, Cu or W, or ITO (In doped $SnO_2$) or FTO (F doped $SnO_2$), or such metals formed on an Si wafer.

Hereinafter, description of the fabrication method of a negative active material for a secondary battery according to the present invention will be given in detail.

In the present invention, electrospinning is used to obtain a metal oxide nano-fiber network. However, the method of the present invention is not limited to electrospinning, and may use melt-blowing, flash spinning, electrostatic melt-blowing, and the like.

Preparation of Electrospinning Solution

A sol-gel precursor of a metal oxide (hereinafter, also referred to as an "inorganic oxide") is mixed with a polymer solution for electrospinning. Here, the polymer serves to increase the viscosity of the solution to form fiber phases when spinning, and to control the structure of the spun fiber due to its miscibility with the inorganic oxide precursor.

The metal oxide precursor used in the present invention is a precursor containing ions such as Sn, Ti, Ni, Fe, Co, Cu, Zn, In, Mo, W, and the like. There is no specific limitation of the precursor as long as the precursor can form an oxide, such as $SnO_2$, $TiO_2$, $NiO$, $Fe_2O_3$, $Fe_3O_4$, $CoO$, $Co_3O_4$, $CuO$, $ZnO$, $In_2O_3$, $MoO_3$, $WO_3$ through thermal treatment at a high temperature (e.g., more than 200° C.) after being spun while being mixed with the polymer. For instance, tin acetate can be used as an $SnO_2$ precursor. Any precursor including Sn such as $SnCl_2$, $SnSO_4$, and the like can be used. The electrospinning solution is prepared by using a sol-gel reaction of the inorganic oxide. In the examples of the present invention, an $SnO_2$ nano-fiber network is formed through electrospinning using tin acetate.

The polymer used in the present invention may be at least one selected from polyurethane copolymer containing polyurethane and polyetherurethane, a cellulose inducer such as cellulose acetate, cellulose acetate butylate, and cellulose acetate propionate, polymethylmethacrylate (PMMA), polymethylacrylate (PMA), polyacryl copolymer, polyvinyl acetate (PVAc), polyvinyl acetate copolymer, polyvinyl alcohol (PVA), polyperfluoroacrylate (PPFA), polystyrene (PS), polystyrene copolymer, polyethylene oxide (PEO), poly(propylene oxide) (PPO), polyethylene oxide copolymer, polypropylene oxide copolymer, polycarbonate (PC), polyvinyl chloride (PVC), polycaprolactone, polyvinylpyrrolidone (PVP), polyvinylfluoride, polyvinylidenfluoride copolymer, and polyamide. However, the present invention is not limited to the above examples, and any kinds of polymers that can form an ultrafine fiber through electrospinning, etc. may be used.

The polymers usable in carrying out the present invention may be roughly divided into polymers having excellent miscibility with a metal oxide precursor and polymers having low miscibility with a metal oxide precursor. Examples of the polymers having excellent miscibility with a metal oxide precursor include PVAc, polyvinylpyrrolidone, polyvinylalcohol, polyethyleneoxide, and the like. If electrospinning is performed using such polymers, phase separation occurs slowly to thereby generate a sol-gel reaction, as will be described later. Examples of the polymers having low miscibility with a metal oxide precursor include polystyrene, and the like. If electrospinning is performed using such polymers, it is difficult to maintain phase equilibrium and the polymer is rapidly solidified due to its low miscibility with the metal oxide precursor. However, such polymers with low miscibility may be used to obtain a nano-fiber network structure having a particular surface structure through thermal treatment after thermal compression and partial/entire melting of the polymer.

An example of the preparation process of the electrospinning solution will now be described in detail. First, polyvinyl acetate having great affinity with an $SnO_2$ precursor is dissolved into dimethylformamide, acetone, tetrahydrofuran, toluene, or a mixed solvent thereof. And, a polymer solution of 5~20 weight %, which generates viscosity suitable for fiber formation using electrospinning, is prepared. Polyvinyl acetate uses a polymer having an average molecular weight in the range of 100,000 to 1,500,000 g/mol.

Thereafter, tin acetate is added into the polyvinyl acetate polymer solution in the range of 1 to 60 wt % of the polymer solution, and acetic acid as a catalyst is added into the polymer solution in the range of 0.01~60 wt % of the tin acetate. The resulting solution is reacted at room temperature for 1 to 10 hours, and then used as an electrospinning solution.

Fabrication of Metal Oxide/Polymer Composite Fiber

Then, an ultrafine composite fiber network is obtained by electrospinning using an electrospinning device.

Figure 2:
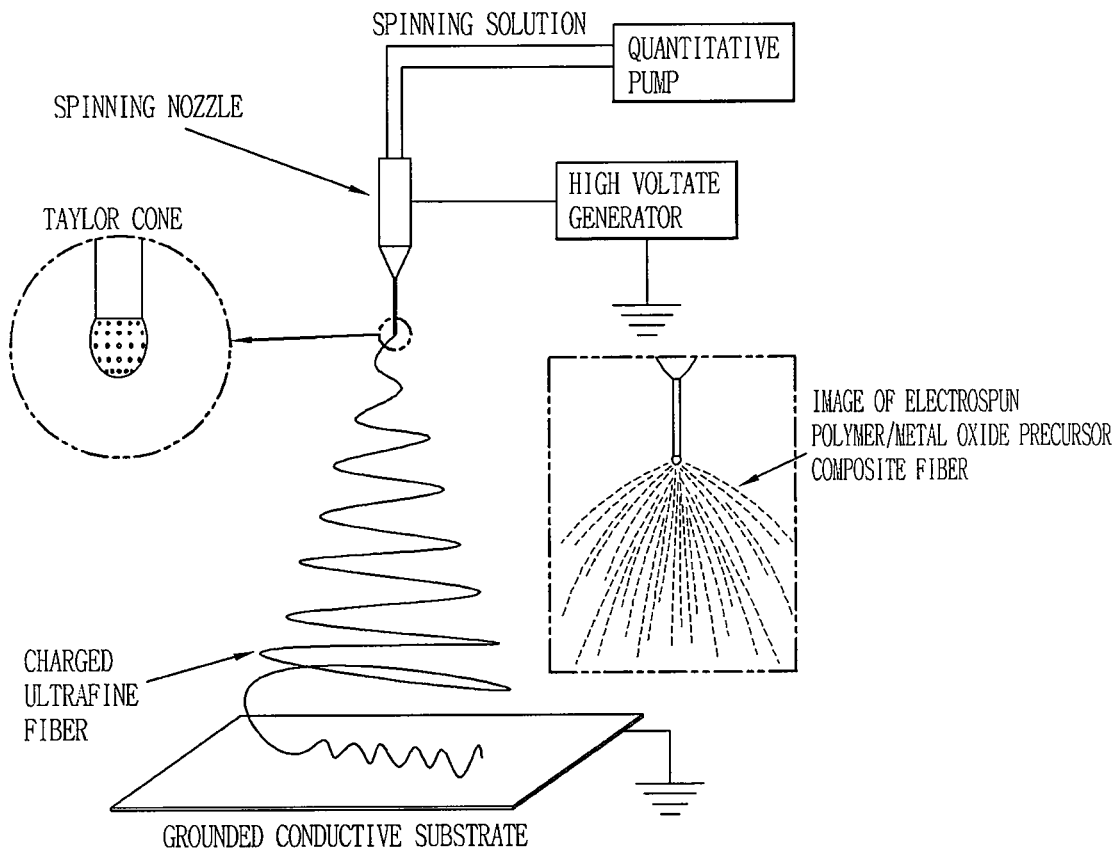
FIG. 2 is a schematic view of an electrospinning device used in the present invention.

Referring to FIG. 2, the electrospinning device includes a spinning nozzle connected to a quantitative pump for injecting a fixed quantity of a spinning solution, a high voltage generator, and an electrode on which a spun fiber layer is formed, and the like. Depending upon the particular use or purpose, a grounded metal plate (e.g., Pt, Au, Pd, Ir, Ag, Rh, Ru, Ni, Cr, Mo, stainless steel, Al, Cu or W), or a transparent conductive oxide electrode (e.g., ITO or FTO) is used as a cathode. And, the spinning nozzle having a pump which can control a discharge quantity per hour is used as an anode. The ultrafine fiber having a thickness of 50 nm to 1000 nm is fabricated by applying 10 to 30 kV and by controlling the solution discharge speed to 10 to 50 μl/minute. The electrospinning is carried out until a film of the ultrafine metal oxide semiconductor fiber is formed on the collector with a thickness of 0.1 to 20 μm.

The electrospun inorganic oxide/polymer composite fiber is accompanied by a complicated formation process. As shown in FIG. 2, the spinning solution is sprayed through the spinning nozzle electrified by the high voltage generator, and drawn to the grounded conductive substrate by an electric field. A jet flow of the spinning solution is generated from the spinning nozzle to the grounded substrate. The jet flow is formed in a conical shape, called a "Taylor cone." When spinning is started from the Taylor cone having a large positive charge formed by the spinning nozzle of the electrospinning device, a sol state of an inorganic oxide precursor is converted into a gel state by a reaction with moisture in the air.

With this sol-gel conversion, the spinning is accelerated and the diameter of the fiber is thinned. Accordingly, the surface area thereof is enlarged and the used solvent is volatilized. During this process, along with the foregoing chemical reaction, the concentration of the solution is rapidly changed. In addition, the temperature of the fiber surface is lowered by volatilization of the solvent, and moisture in the air is condensed, thereby changing the degree of the sol-gel conversion reaction. Especially, since the electrospinning using the inorganic oxide-polymer mixed solution is influenced by moisture, the ambient temperature and humidity during the electrospinning are very important process parameters.

Fabrication of a Metal Oxide Nanofiber Network

The collector, on which the electrospun ultrafine composite fiber is laminated, is pressed under a pressure of 1.5 Kgf/cm$^2$ (21.34 psi, based on 1.5 Ton, 10 cm×10 cm collector) at a temperature higher than a glass transition temperature of the used polymer (120° C. if polyvinyl acetate is used as the polymer), and thermally compressed for 1 to 10 minutes. The pressure, temperature and time for the thermocompression can be properly selected, considering the type of polymer used, the glass transition temperature of the polymer, and the like. Further, if the melting can occur at a temperature higher than the glass transition temperature of the polymer, it is possible to apply heat to the collector without compression or to pressurize the collector using hot compressed air. In this process, flow between the metal oxide precursor which is phase-separated during the electrospinning and the polymer is controlled, and after thermal treatment, a network of nanofibers including a nano-grain and/or nano-rod, and/or nano-particles structure is formed.

Through the thermal compression or thermal pressurization process, a is specific structure can be obtained in which the polymer in the composite fiber is partially or entirely melted, adhesion with the collector is enhanced, and density per surface area and unit volume are greatly enhanced after such thermal treatment. Accordingly, a negative active material having a high power density (high C-rate) can be obtained. The metal oxide nano-fibers, which have not undergone thermocompression, are easily separated from the substrate after the thermal treatment.

If the polymer is removed by being decomposed through thermal treatment at 450° C. for 30 minutes after thermocompression, a metal oxide nano-fiber network including nano-grains, nano-rods, or nano-particles is obtained. The thermal treatment temperature and time after the thermocompression are determined by considering the crystallization and sintering temperatures of the metal oxide used. Thermal treatment may be performed at a temperature in the range of 200 to 800° C. according to the type of the metal oxide precursor. Further, a metal oxide nano-fiber network having an amorphous structure can be obtained through thermal treatment at a low temperature, thereby enhancing the cycling characteristics.

EXAMPLE 1

Fabrication of an $SnO_2$ Nano-fiber Network Structure Through Thermocompression and Post-heating Treatment of an $SnO_2$-polyvinyl Acetate Composite Fiber Layer A polymer solution obtained by dissolving 2.4 g of polyvinyl acetate (Mw: 1,000,000) in 15 ml of dimethylformamide for one day was mixed with a solution obtained by dissolving 6 g of tin acetate in 15 ml of dimethylformamide (DMF). Here, the solution was transparent and slightly yellowish. Since tin acetate is easily dissolved in DMF, a reaction occurred well without additionally using acetic acid for catalysis.

Figure 3:
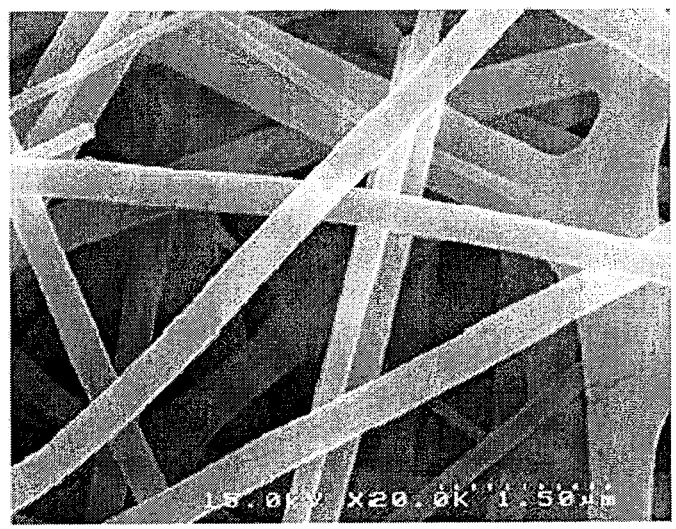
FIG. 3 is an SEM (scanning electron microscope) image of $SnO_2$/PVAc composite fibers formed by electrospinning a prepared mixed solution of a $SnO_2$ precursor and PVAc on a collector.

The transparent precursor in which the reaction had occurred was transferred into a syringe and mounted on the electrospinning device. Then, a voltage was applied between the tip provided at the end of the syringe and a collector to obtain an $SnO_2$-polyvinylacetate composite fiber layer (see FIG. 3). In this case, the voltage was 12 kv, the flow rate was 30 μl/min, the total discharge amount was 500 to 5,000 μl, and the distance between the tip and the collector was 10 cm. Especially, a change in the $SnO_2$ nano-fiber structure was observed depending on the acetic acid content used for the sol-gel reaction. In this example, acetic acid was not separately used. The polymer and $SnO_2$ precursor were mixed in the $SnO_2$-polyvinylacetate composite fiber layer fabricated by the electrospinning.

Figure 4:
FIG. 4 is an SEM image of a polymer melted by thermocompressing the $SnO_2$/PVAc composite fiber shown in FIG. 3 under a pressure of 1.5 Kgf/cm$^2$ (21.34 psi) at 120° C. for 10 minutes.
Figure 5:
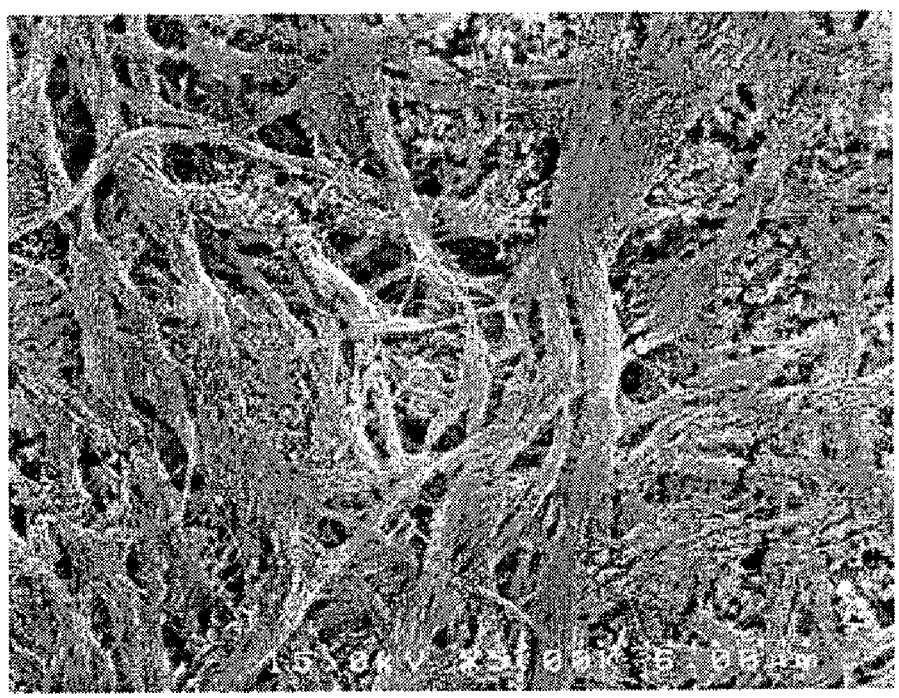
FIG. 5 is an SEM image of $SnO_2$ nanofibers obtained by thermal treatment through thermocompression, showing that a continuous nanofiber network having meso-pores is well formed.
Figure 6:
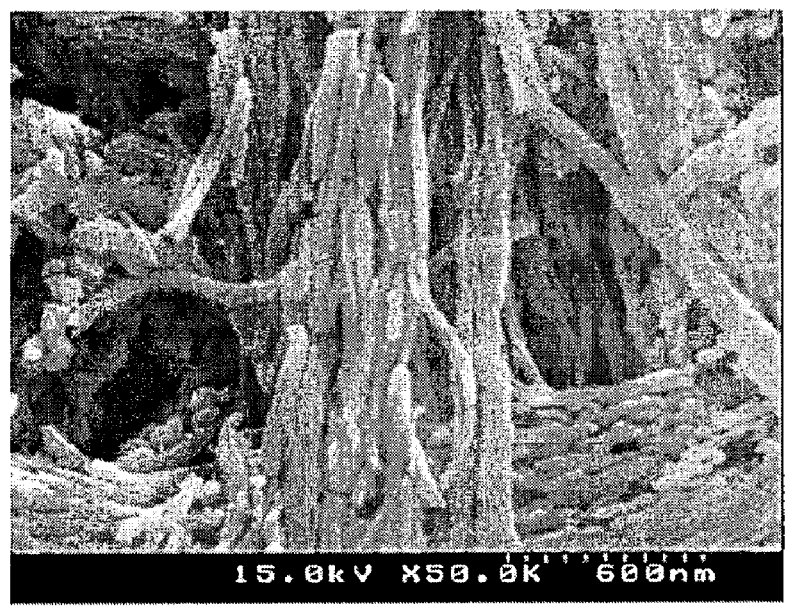
FIG. 6 is an enlarged view of a portion of FIG. 5.
Figure 7:
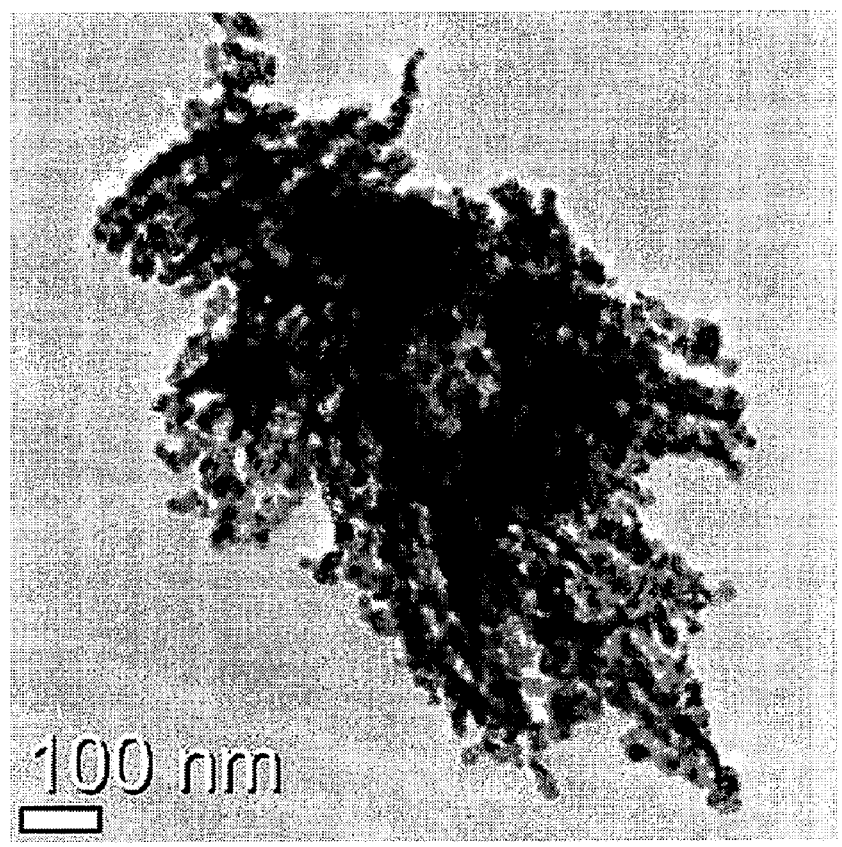
FIG. 7 is a TEM (transmission electron microscope) image of $SnO_2$ nanofibers obtained by thermal treatment through thermocompression, showing that a nanofiber network composed of single crystalline $SnO_2$ nanograins is well formed.
Figure 8:
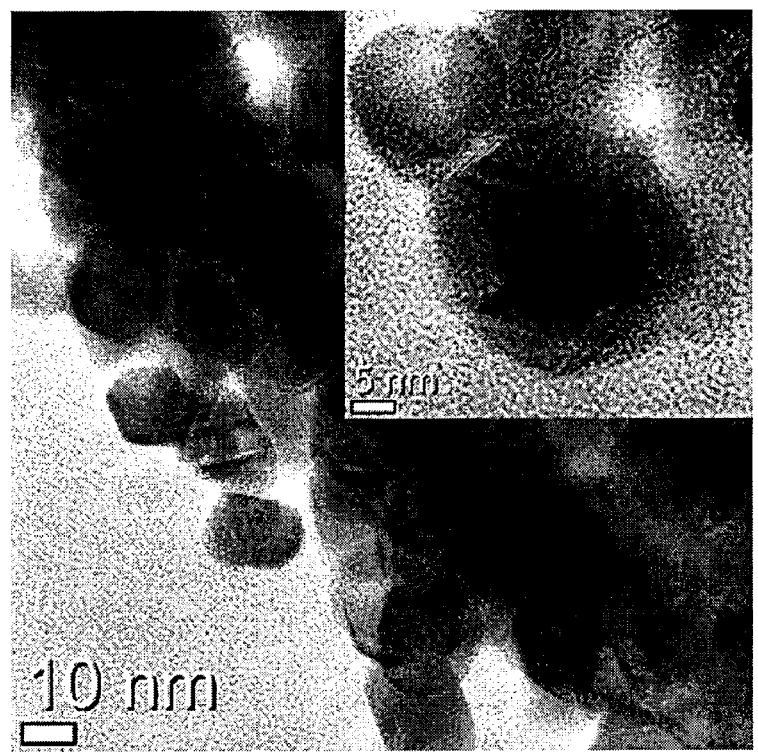
FIG. 8 is an image of individual grains of the nanofiber network in FIG. 7.
Figure 9:
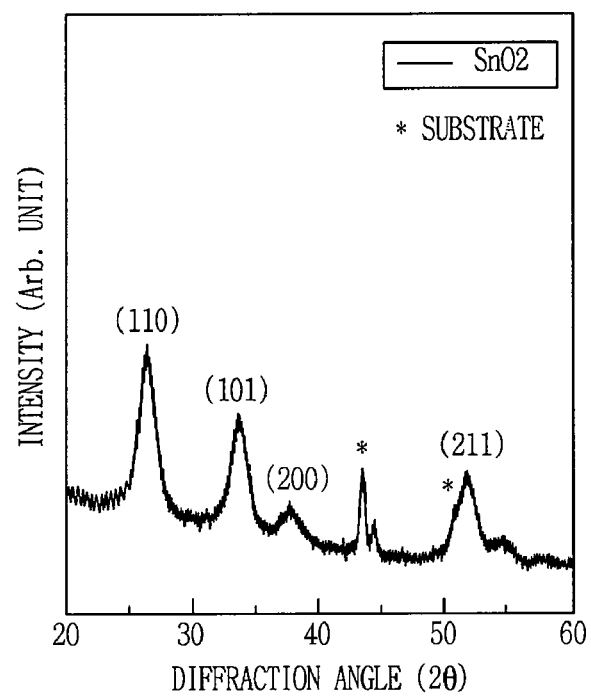
FIG. 9 is a graph which illustrates an X-ray diffraction analysis of $SnO_2$ fabricated by the method of the present invention, showing that single-phase $SnO_2$ is well observed even after thermal treatment at 450° C.

The collector onto which the polymer-$SnO_2$ composite fiber had been electrospun was thermally compressed in a press heated at 120° C. under a pressure of 1.5 kgf/cm$^2$ (21.34 psi) for 10 minutes. Here, it was noticed that the surface structure thereof was changed according to the degree of pressure applied. In addition, the thermo-pressing temperatures could be differently set according to the polymer used. FIG. 4 shows a structure wherein $SnO_2$/PVAc composite fibers are connected to each other through a complete melting process of the PVAc occurring during the thermal compression. FIG. 5 shows that a continuous nanofiber network composed of nano-grains and/or nano-particles was obtained after thermal treatment at 450° C. for 30 minutes through thermocompression. FIG. 6, which is an enlarged surface image of FIG. 5, shows that a network of ultrafine nano-fibers having a diameter much smaller than that of the composite fiber shown in FIG. 3 was well formed. The average diameter of the nano-fibers obtained according to the method of the present invention was 10-600 nm, and the average size of the nano-grains of the nano-fibers was 5-60 nm. As shown in FIGS. 7 and 8, it was indicated through TEM analysis that such nano-grains had a single crystalline structure of $SnO_2$. Further, fine pores are formed among the nano-grains, and the average size of the fine pores was 1-40 nm. In the case of such $SnO_2$ nano-fiber network obtained by thermocompression/thermal treatment, it was observed through X-ray diffraction analysis that single-phase $SnO_2$ was well formed as shown in FIG. 9. Meanwhile, even though not shown, when the thermal treatment temperature was increased, the size of the nano-grains of the nano-fibers and the size of the pores existing among the nano-grains were increased. Here, it was measured that the average size of the nano-grains was 5-100 nm, and the average size of the pores was 1-100 nm. This indicated that a nano-fiber network having nano-grains and/or nano-rods with a different size could be formed through the control of the growth behavior of the grains according to the change in the thermal treatment temperature.

EXPERIMENTAL RESULTS 1

Evaluation of Characteristics of a Lithium Secondary Battery Using an $SnO_2$ Nano-fiber Network as a Negative Active Material To identify the characteristics of the $SnO_2$ nano-fiber network formed on a stainless steel substrate according to Example 1 as a negative active material, a coin cell (CR2032-type coin cell) structure was fabricated as described below. In the cell structure, an EC/DEC (1/1 volume %) solution in which 1M of $LiPF_6$ was dissolved was used as an electrolyte. For a cathode to be used as a reference electrode and a counter electrode, a metal lithium foil (Foote Mineral Co.) of a degree of purity of 99% was used. For a working electrode, an $SnO_2$ nano-fiber network thin layer as obtained in Example 1 was used. As a separator for preventing electrical shorting between the cathode and anode, a polypropylene film (Celgard Inc.) was used. Such cell was fabricated under an Ar atmosphere in a glove box made by VAC Co., Ltd.

The experimental equipment used here for charging/discharging was a Model WBCS3000 made by WonATech Co., Ltd., and the volume change under a constant current was observed using an MPS (Multi Potentiostat System), which can measure 16 channels using 16 boards at the same time. The intensity of the current density used during charging/discharging was based on a C-rate from 0.2 to 8 by calculating the theoretical capacity ($SnO_2$: 1493 mAh/g). For the $SnO_2$ nano-fiber network, the cut-off voltage was 0.1 V~1.1 V.

Figure 10:
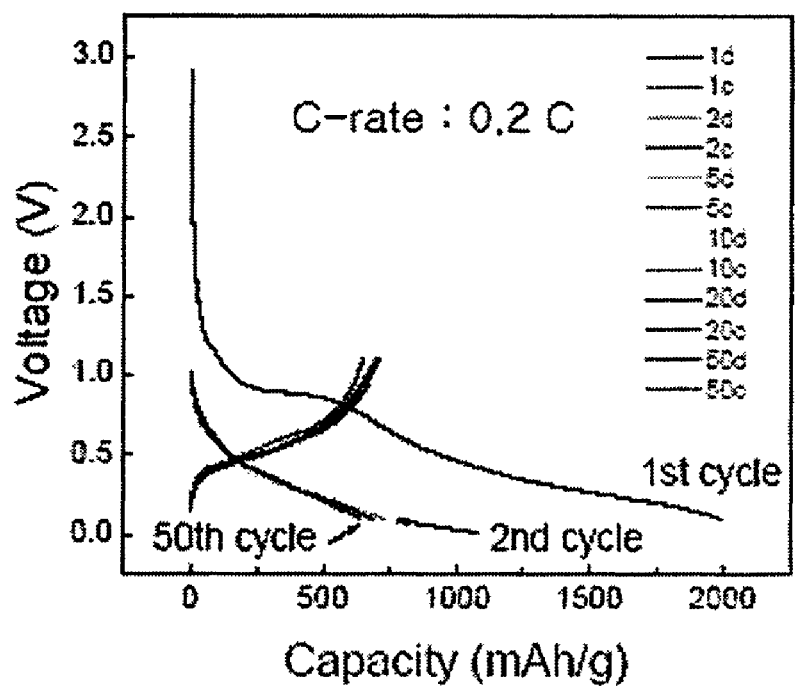
FIGS. 10 and 11 are graphs which illustrate charging/discharging cycling characteristics when an $SnO_2$ nanofiber was used as a negative active material, respectively showing the results measured at 0.2 C and 2 C.
Figure 11:
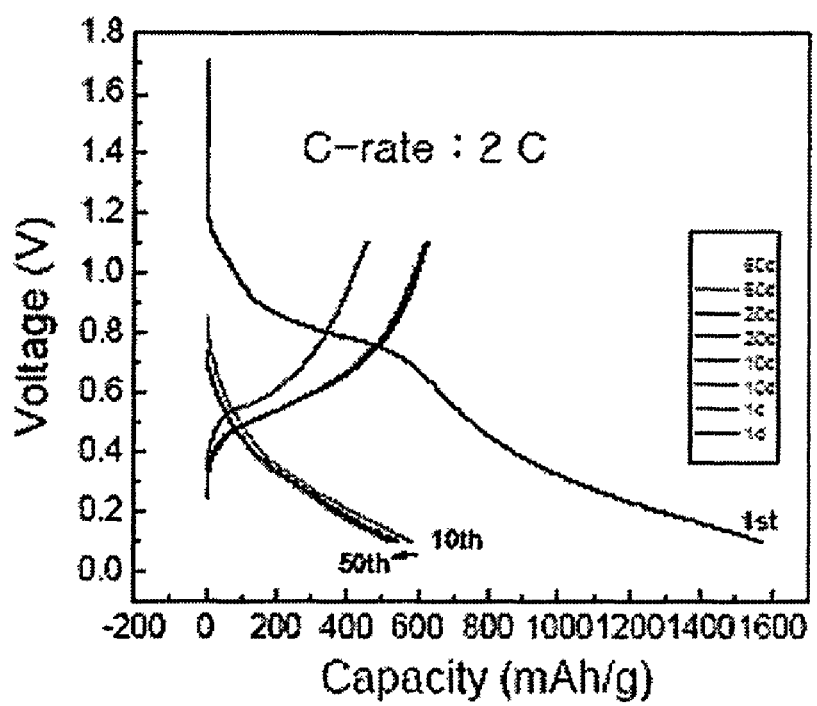

FIG. 10 shows the charging/discharging characteristics of the $SnO_2$ nano-fiber network negative active material according to the cycle measured at a C-rate of 0.2. In the first discharge reaction, a plateau was observed near 1V vs. Li+/Li. In addition, a decrease in the irreversible capacity was exhibited in the first cycle, and stable cycling characteristics were exhibited from the second cycle. By maintaining a discharge capacity of 600 mAh/g after the second cycle even through the 50th cycle, a capacity efficiency much greater than the theoretical capacity value (372 mAh/g) of a commercialized carbon material (graphite) was shown. This result indicates that a high capacity of more than 500 mAh/g was maintained after the $50^{th}$ cycle even under a high current (C-rate of 2) as shown in FIG. 11, and stable cycling characteristics are observed without capacity decrease after the second cycle. The C-rate is defined as the current flowing when the capacity is completely discharged within 1 hour. Accordingly, it is said that the higher the C-rate, the higher the level of the maximum current which can be momentarily outputted. This can be a very important characteristic for an electric power source for electronic and mechanical devices which may require a high momentary output.

Figure 12:
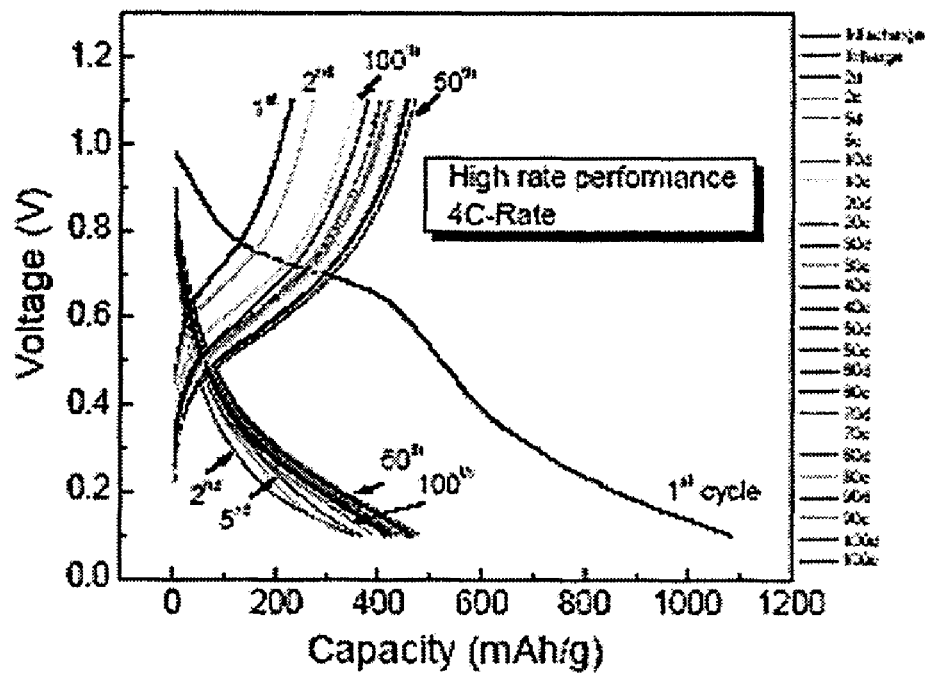
FIGS. 12 and 13 are graphs which illustrate charging/discharging cycling characteristics when an $SnO_2$ nanofiber was used as a negative active material, respectively showing the results measured at 4 C and 8 C.
Figure 13:
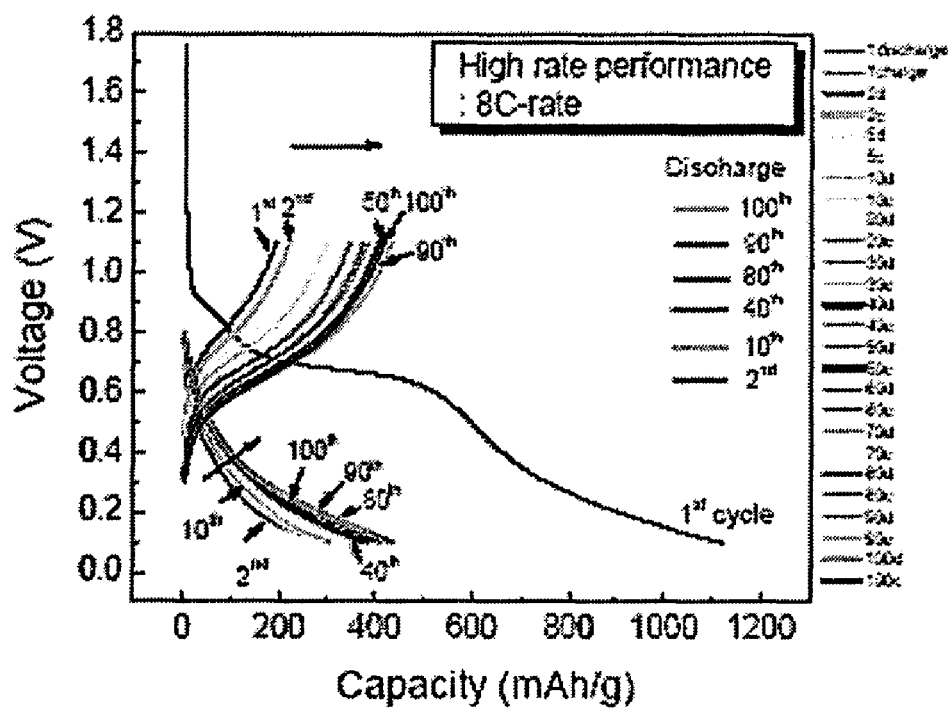

FIG. 12 shows the charging/discharging characteristics of the $SnO_2$ nano-fiber network negative active material according to the cycle measured at a C-rate of 4. In the 4 C-rate case, the discharge capacity value after the $100^{th}$ cycle was maintained at 350 mAh/g, and behavior in which the cycling characteristics gradually increased after the second cycle was shown. Further, it was observed that the cycling characteristics were only slightly reduced after the $50^{th}$ cycle, and were maintained at a value of 390 mAh/g at the $100^{th}$ cycle. In the first discharge reaction, a plateau was observed near 1V vs. Li+/Li. FIG. 13 shows the charging/discharging characteristics of the $SnO_2$ nano-fiber network negative active material according to the cycle measured at a C-rate of 8. This means a current rate which can consume all self-capacitance during discharge for ⅛ hour. Also, at the C-rate of 8, stable characteristics are shown after the second cycle. By exhibiting a discharge capacity of more than 300 mAh/g, it was proven that the nano-fiber network structure of $SnO_2$ shows very excellent characteristics as a negative active material with high output.

Figure 14:
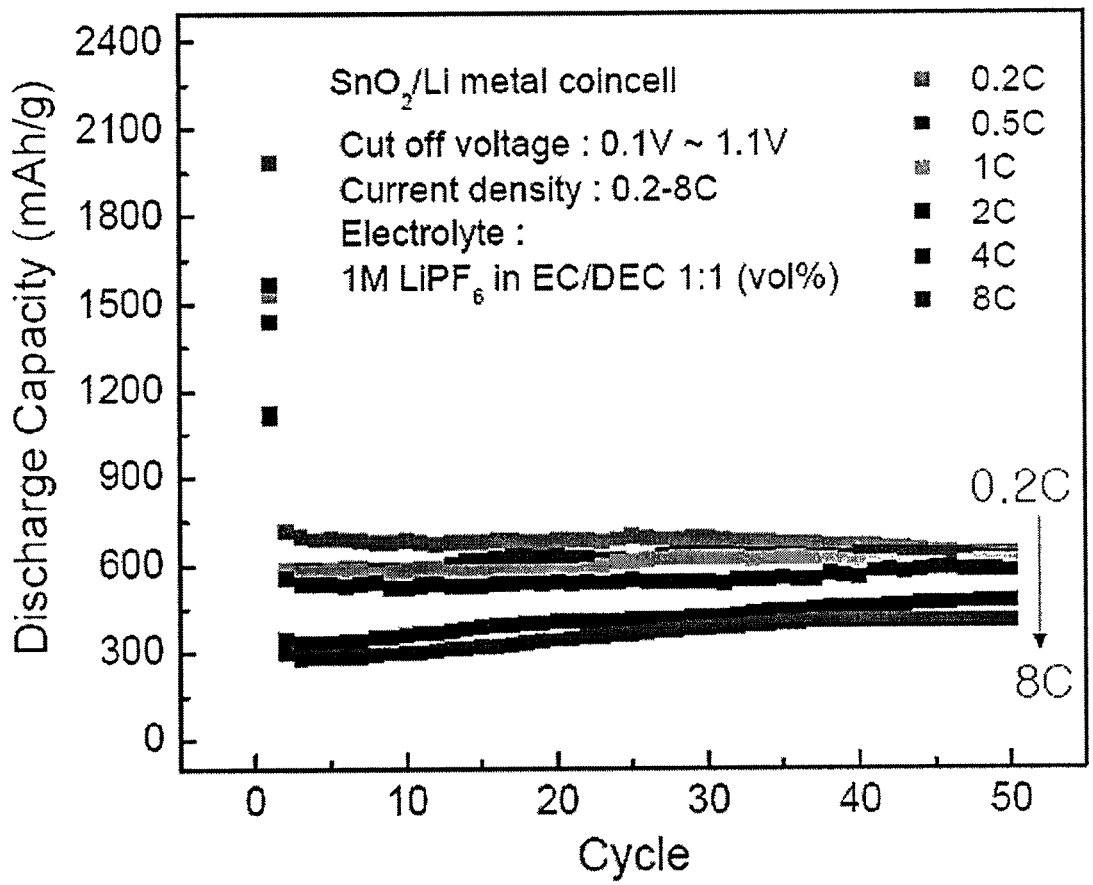
FIG. 14 is a graph illustrating discharge capacity by rate from 0.2 C to 8C according to the number of charging/discharging cycles when an $SnO_2$ nanofiber was used as a negative active material.

FIG. 14 is a graph showing the capacity-cycling characteristics of the $SnO_2$ nano-fiber network negative active material by C-rate. As the C rate changed from 0.2 C to 8 C, stable discharge capacity was shown till the $50^{th}$ cycle without cycle reduction. In the case of a C-rate of 8, by maintaining the discharge capacity value higher than 300 mAh/g, the level of the maximum current which can be momentarily outputted was very high. Accordingly, it is possible to be used as an anode material for a secondary battery of a high output as well as a high capacity.

EXAMPLE 2

Fabrication of an $Fe_2O_3$ Nano-fiber Network Through Thermocompression and Post-heating Treatment of an $Fe_2O_3$-polyvinyl Alcohol Composite Fiber Layer 2.5 g of polyvinyl alcohol (PVA, Mw: 88,000) was dissolved by stirring into 20 g of DI water for one day with heat. The PVA solution was mixed with a solution obtained by dissolving 5 g of anhydrous $FeCl_3$ in 15 g of DI water. A transparent deep green solution could be obtained after stirring for several minutes. Then, 2 g of acetic acid and 0.05 g of Cetyltrimethylammonium bromide (CTAB) were added therein and stirred for several minutes. Here, CTAB serves as an additive for facilitating electrospinning by controlling electric charge characteristics of the metal oxide precursor.

After such prepared solution was transferred into a syringe and electrospun, a light green PVA-$FeCl_3$ organic/inorganic composite fiber could be obtained (applied voltage: 14 kV, flow rate: 10 μl/min, amount of fabricated fiber: 500 μl, substrate: SUS, distance between the tip and collector: 10 cm).

Figure 15:
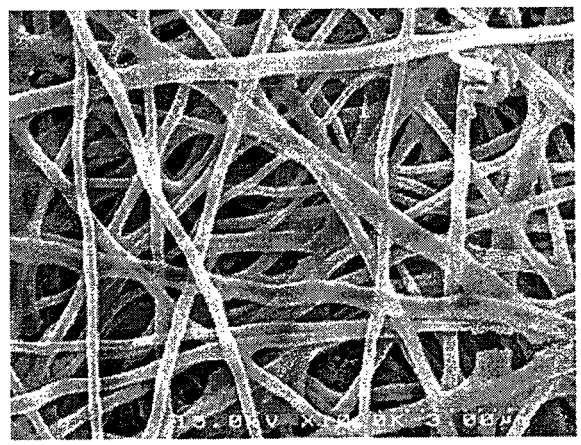
FIG. 15 is an SEM image of $Fe_2O_3$/PVA composite fibers formed by electrospinning a prepared mixed solution of a $Fe_2O_3$ precursor and PVA on a collector.
Figure 16:
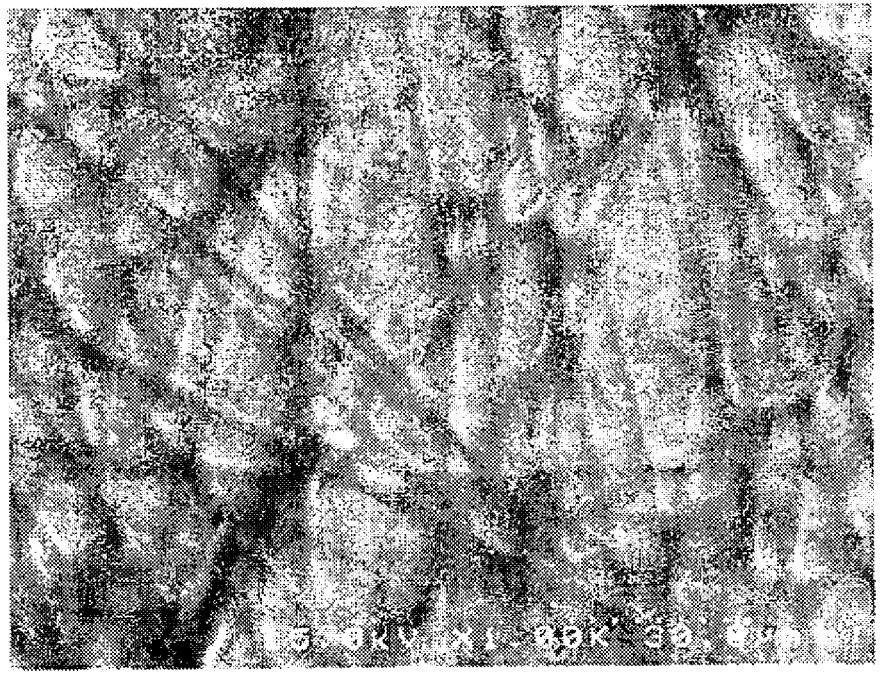
FIG. 16 is an SEM image of a polymer melted by thermocompressing the $Fe_2O_3$/PVA composite fibers shown in FIG. 15 under a pressure of 1.5 Kgf/cm$^2$ (21.34 psi) at 120° C. for 5 minutes.
Figure 17:
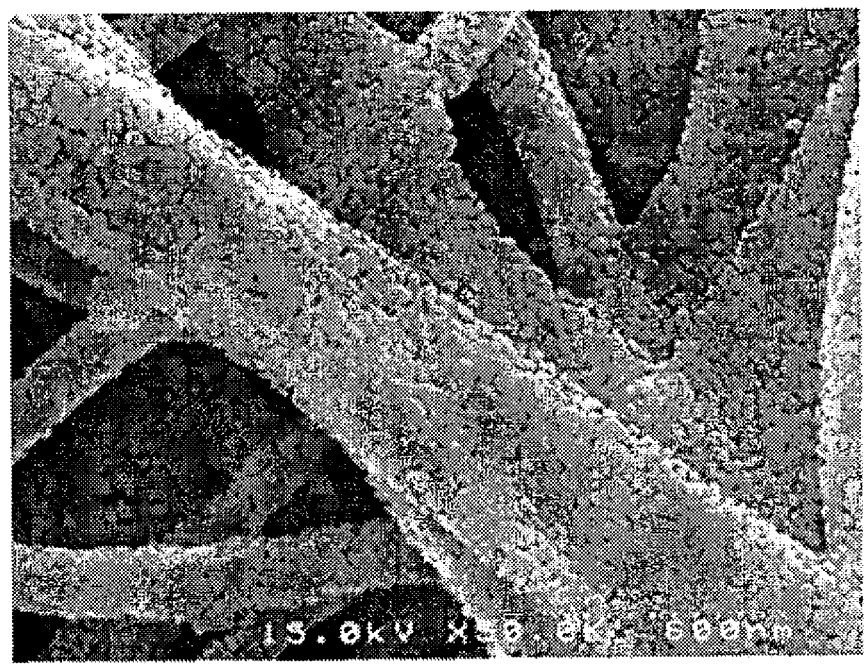
FIG. 17 is an SEM image taken after thermally treating the thermocompressed $Fe_2O_3$/PVA composite fibers at 500° C., showing that a nanofiber network structure composed of nanograins is well formed.
Figure 18:
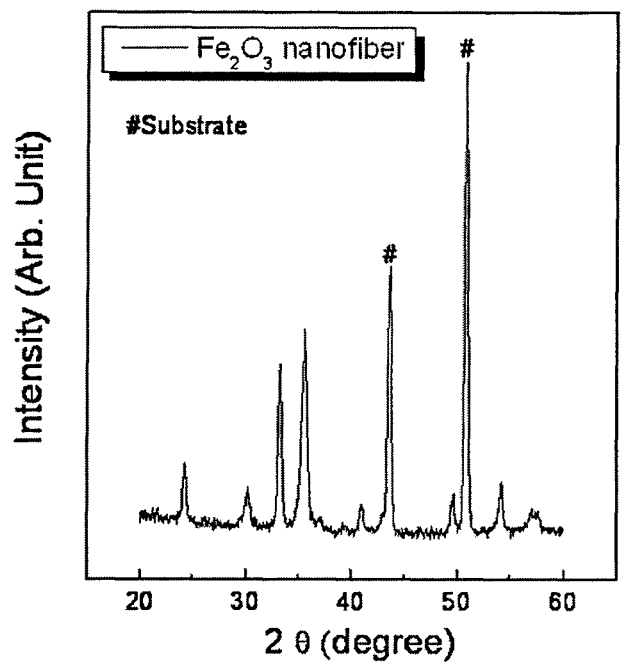
FIG. 18 is a graph which illustrates an X-ray diffraction analysis of $Fe_2O_3$ fabricated by the method of the present invention, showing that single-phase $Fe_2O_3$ is well observed even after thermal treatment at 500° C.

The obtained composite fiber was pressed using a lamination machine (120° C., pressure: 1.5 ton, time: 5 minutes) and was again sintered at 500° C. for 1 hour to obtain $Fe_2O_3$ nano-fibers. Here, it was noted that the surface structure was changed according to the degree of applied pressure. Also, the thermal pressurization temperatures could be set differently according to the polymers used. FIG. 15 shows an image of the surface of PVA-$FeCl_3$ composite fibers after electrospinning. In particular, FIG. 16 shows a structure in which $FeCl_3$-PVA composite fibers are connected to each other through complete melting of the polymer (PVA) occurring during the compression. FIG. 17 shows that a continuous nano-fiber network having a diameter of 200-600 nm composed of nanograins can be obtained through thermal treatment at 500° C. for 1 hour after thermal compression. Such obtained $Fe_2O_3$ nano-fiber has a fine porous structure, thereby greatly increasing its surface area. The oxide is formed by the entire or partial melting of the PVA through thermal compression, thereby forming an anode for a secondary battery having excellent adhesion with a lower substrate. It was noted that Fe oxide is well formed through an X-ray diffraction analysis as shown in FIG. 18.

EXPERIMENTAL RESULTS 2

Evaluation of Characteristics of a Lithium Secondary Battery Using an $Fe_2O_3$ Nano-fiber Network as a Negative Active Material To identify the characteristics of an $Fe_2O_3$ nano-fiber network according to Example 2 formed on a stainless steel substrate as a negative active material, a coin cell (CR2032-type coin cell) structure was fabricated by the same method as in the above-mentioned Experimental Results 1, except that the $Fe_2O_3$ nano-fiber network thin layer obtained in Example 2 was used as a working electrode.

The experimental equipment for charging/discharging used in Experimental results 1 was used to observe the volume change under a constant current. The intensity of current density used during charging/discharging was based on a C-rate of from 0.2 to 1, by calculating the theoretical capacity ($Fe_2O_3$: 1436 mAh/g). For the $Fe_2O_3$ nano-fiber network, the cut-off voltage was 0.1V~2.5V.

Figure 19:
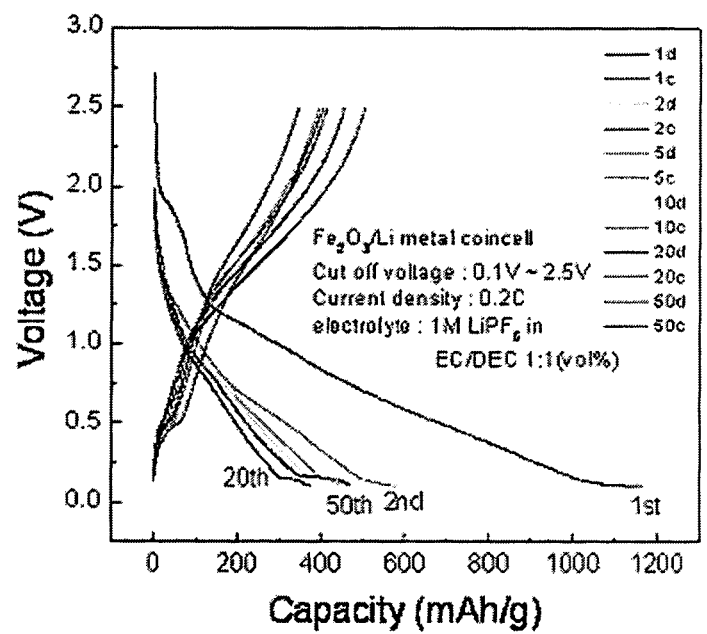
FIGS. 19 and 20 are graphs which illustrate charging/discharging cycling characteristics when an $Fe_2O_3$ nanofiber was used as a negative active material, respectively showing the results measured at 0.2 C and 1 C.
Figure 20:
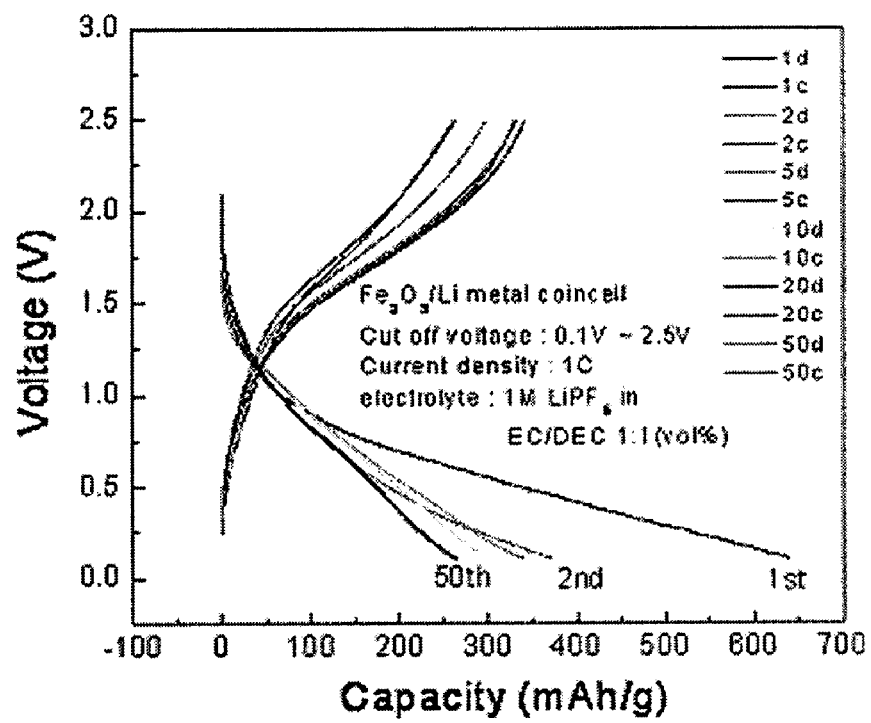

FIG. 19 shows the charging/discharging characteristics of the $Fe_2O_3$ nano-fiber network negative active material according to the cycle measured at a C-rate of 0.2. In the first discharge reaction, a high capacity value of 1200 mAh/g is shown. In addition, a decrease in irreversible capacity was shown in the first cycle, and stable cycling characteristics from the second cycle were shown. By showing the discharge capacity of 600 mAh/g after the second cycle and maintaining a capacity value of more than 400 even after the 50th cycle, capacity efficiency higher than a theoretical capacity value (372 mAh/g) of a commercialized carbon material (graphite) was exhibited. This result shows that a high capacity of more than 260 mAh/g is maintained after the $50^{th}$ cycle even under a high current (C-rate of 1) as in FIG. 20.

EXAMPLE 3

Fabrication of a $TiO_2$ Nano-fiber Network Through Thermocompression and Post-heating Treatment of a $TiO_2$-polyvinyl Acetate Composite Fiber Layer 6 g of titanium propoxide (Titanium(IV) propoxide) was added to be stirred into a polymer solution prepared by dissolving 37.5 ml of a mixed solvent of dimethylformamide (DMF) into 3 g of polyvinyl acetate (Mw: 850,000). Then, 2.4 g of acetic acid was slowly added as a reaction catalyst.

Figure 21:
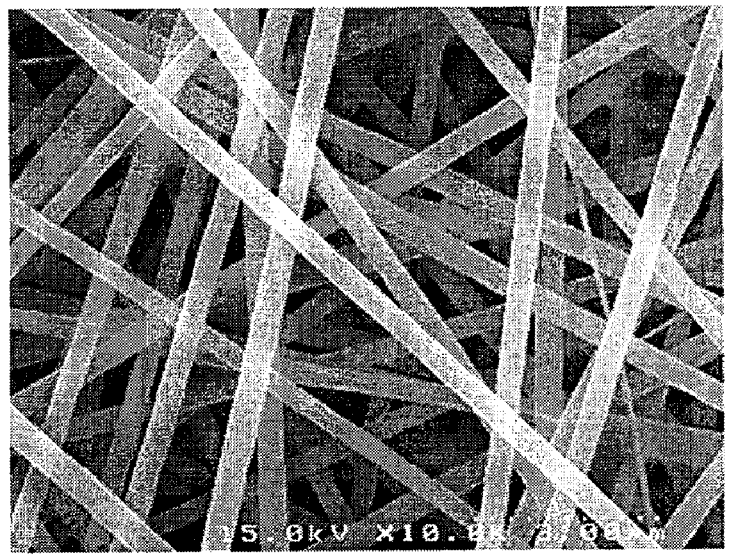
FIG. 21 is an SEM image of $TiO_2$/PVAc composite fibers formed by electrospinning a prepared mixed solution of a $TiO_2$ precursor and PVAc on a collector.
Figure 22:
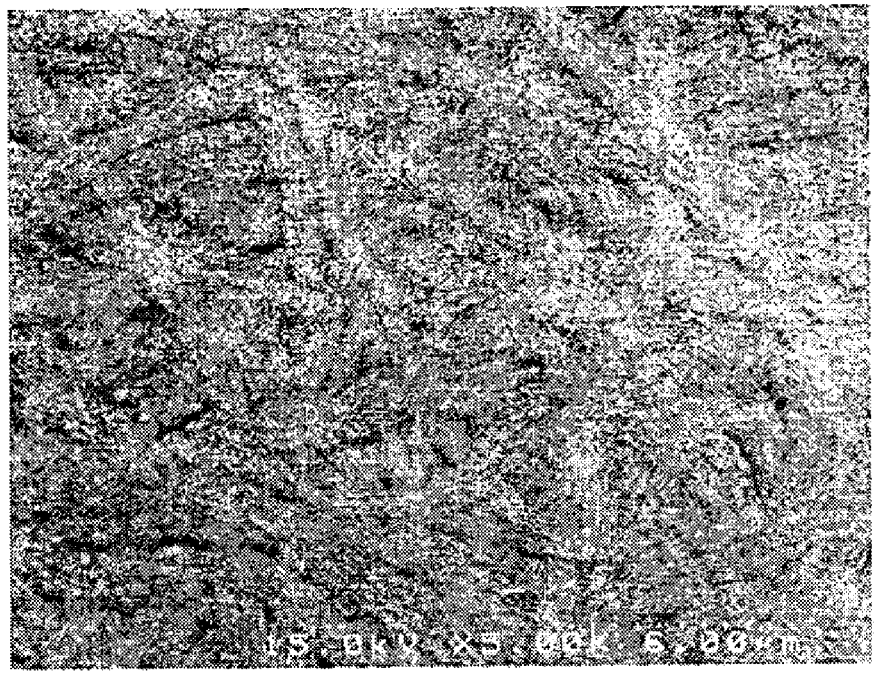
FIG. 22 is an SEM image of polymer melted by thermocompressing the $TiO_2$/PVAc composite fibers shown in FIG. 21 under a pressure of 1.5 Kgf/cm$^2$ (21.34 psi) at 120° C. for 10 minutes.
Figure 23:
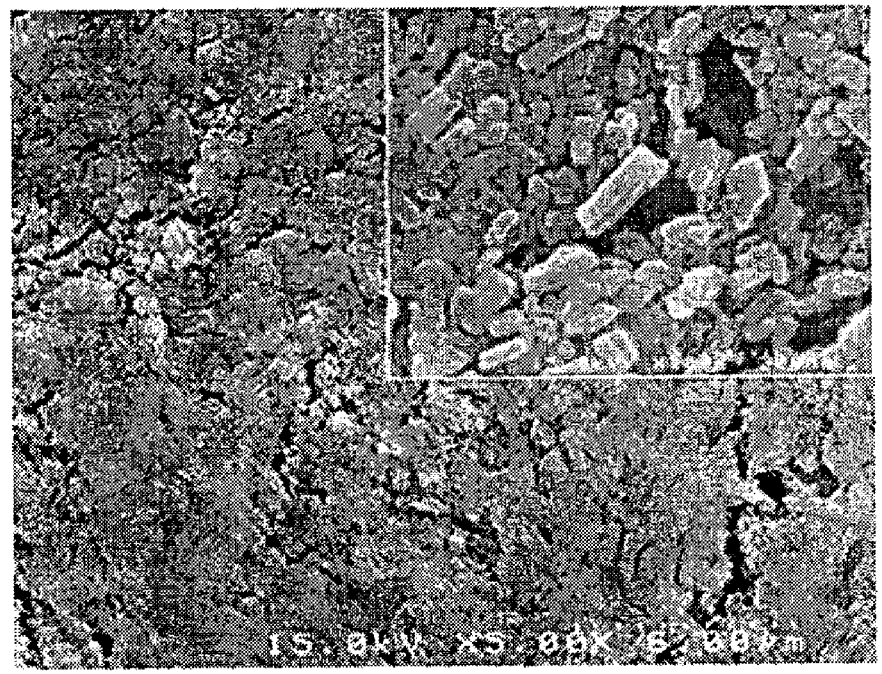
FIG. 23 is an SEM image taken after thermally treating the thermocompressed $TiO_2$/PVAc composite fibers at 450° C., showing that a nanofiber network structure composed of nanorods and nanograins was well formed, and, in the inset photograph of FIG. 23, that the size of the nanorods and nanograins is clearly observable.

The electrospinning was carried out by using the electrospinning device in FIG. 1. A stainless steel (SUS) substrate was used as a cathode, and the metal needle connected to the pump controlling the discharge speed was used as an anode. A voltage of 15 kV was applied between the two electrodes. The discharge speed of the spinning solution was controlled to 30 µg/min. The electrospinning was performed until the total discharge amount became 500-5,000 µl, thereby forming an ultrafine $TiO_2$-polyvinyl acetate composite fiber layer on the stainless steel substrate. Through the SEM image shown in FIG. 21, it was confirmed that $TiO_2$/PVAc composite nano-fibers were well formed, and adhesion with the substrate was enhanced by the partial or entire melting of the PVAc as shown in FIG. 22 through thermal compression. In particular, after thermal treatment at 450° C. through thermal compression, it was noted that a nanorod-shaped nanofiber network having a greatly increased surface area was formed as shown in the SEM image of FIG. 23.

EXPERIMENTAL RESULTS 3

Evaluation of Characteristics of a Lithium Secondary Battery using a $TiO_2$ Nanofiber Network as a Negative Active Material To identify the characteristics of the $TiO_2$ nanofiber network according to Example 3 formed on a stainless steel substrate as a negative active material, a coin cell (CR2032-type coin cell) structure was fabricated by the same method as in the above-mentioned Experimental results 1, except that the $TiO_2$ nanofiber network thin layer obtained in Example 3 was used as a working electrode.

The experimental equipment for charging/discharging used in Experimental results 1 was used to observe the volume change under a constant current. The intensity of current density used when charging/discharging was based on 0.04258 mA. For the $TiO_2$ nanofiber network, the cut-off voltage was 0.8V~2.0V.

Figure 24:
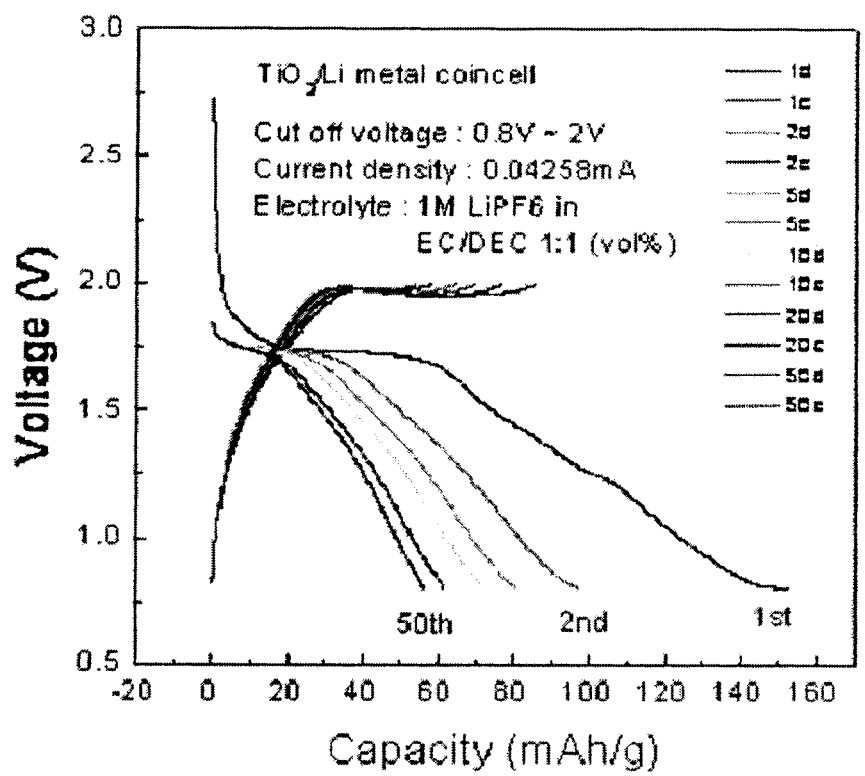
FIG. 24 is a graph which illustrates charging/discharging cycling characteristics when a $TiO_2$ nanofiber is used as a negative active material, showing the result measured at a current density of 0.04258 mA.

FIG. 24 shows the charging/discharging characteristics according to the cycle of the $TiO_2$ nanofiber network negative active material measured at a current density of 0.04258 mA. In the first discharge reaction, a capacity value of 155 mAh/g was exhibited. In addition, a decrease in the irreversible capacity was shown in the first cycle, and stable cycle characteristics were shown from the second cycle. The discharge capacity after the second cycle was shown to be 100 mAh/g, and a capacity value of 58 mAh/g was maintained even after the 50th cycle. Even though the capacity value was greatly reduced compared to that of $SnO_2$ or $Fe_2O_3$, a characteristic value of the nanofiber network structure was well observed, considering the theoretical capacity of bulk $TiO_2$ (167 mAh/g). The values may be enhanced by establishing additional process conditions.

EXAMPLE 4

Fabrication of an NiO Nanofiber Network Structure Through Thermocompression and Post-heating Treatment of an NiO-polyvinyl Alcohol Composite Fiber Layer A polymer solution obtained by dissolving 3 g of polyvinyl alcohol (Mw: 88,000) in 15 ml of DI water for one day was mixed with a solution obtained by dissolving 2.65 g of nickel chloride in 15 ml of DI water. Since nickel chloride is easily dissolved in DI water, a reaction occurred well without additionally using acetic acid for catalysis.

The transparent precursor in which the reaction had occurred was transferred into a syringe and mounted on the electrospinning device. Afterwards, a voltage was applied between the tip provided at the end of the syringe and the collector to obtain an NiO-polyvinyl alcohol composite fiber layer. In this case, the voltage was 18 kV, the flow rate was 28 µl/min, the total discharge amount was 500 to 1,500 µl, and the distance between the tip and the collector was 8 cm. In the present example, acetic acid was not additionally used. The polymer and NiO precursor were mixed in the NiO-polyvinyl alcohol composite fiber layer fabricated by electrospinning.

Figure 25:
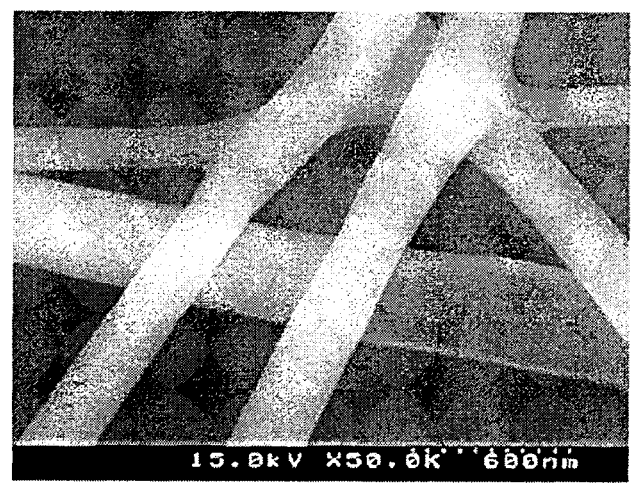
FIG. 25 is an SEM image of NiO/PVA composite fibers formed by electrospinning a prepared mixed solution of a NiO precursor and PVA on a collector.
Figure 26:
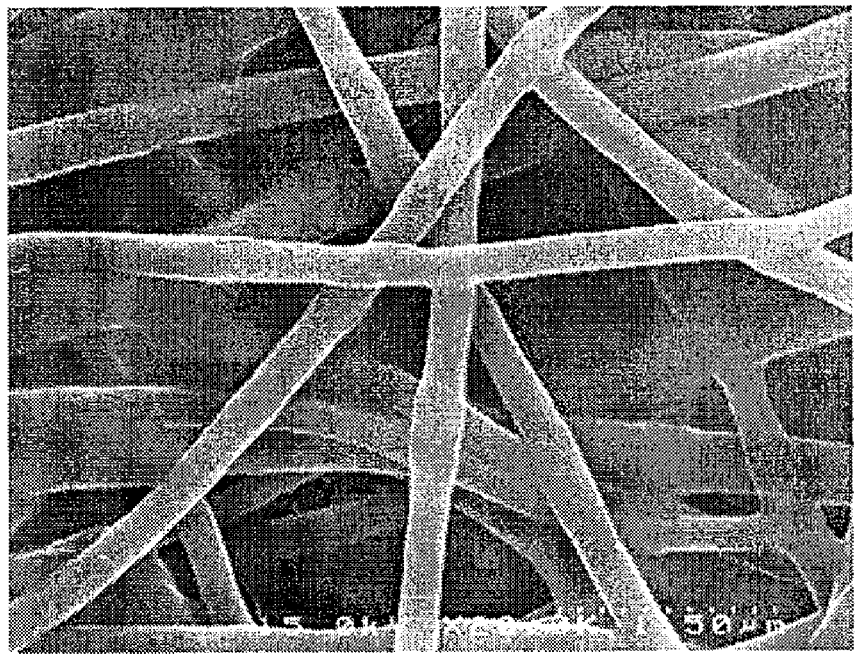
FIG. 26 is an SEM image of polymer melted by thermocompressing the NiO/PVA composite fibers shown in FIG. 25 under a pressure of 1.5 Kgf/cm$^2$ (21.34 psi) at 120° C. for 10 minutes.
Figure 27:
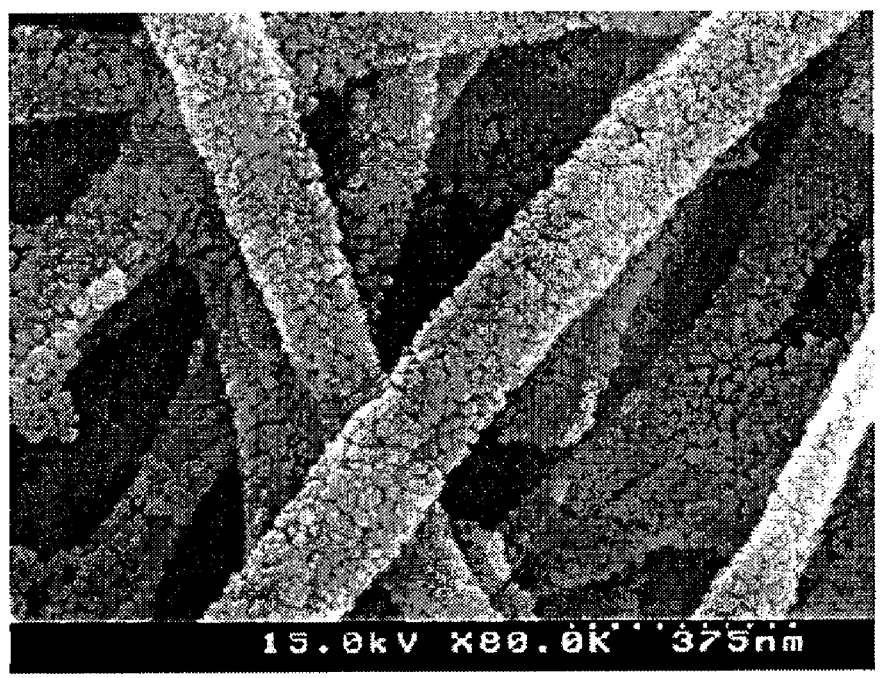
FIG. 27 is an SEM image taken after thermally treating the thermocompressed NiO/PVA composite fibers at 450° C., showing that a nanofiber network structure composed of nanograins is well formed.

The obtained fiber was pressed using a lamination machine (120° C., pressure: 1.5 ton, time: 5 minutes) and again was sintered at 450° C. for 1 hour to obtain NiO nanofibers. Here, it was noted that the surface structure was changed according to the degree of pressure applied. Also, the thermal pressurization temperature could be differently set according to the polymer used. FIG. 25 shows an image of the surface of the NiO-PVA composite nano-fibers after electrospinning. In particular, FIG. 26 shows a structure in which NiO-PVA composite fibers are connected to each other through a complete melting of the polymer (PVA) occurring during the compression. FIG. 27 shows that a continuous nanofiber network having a diameter of 200-600 nm including ultra-fine nanograins can be obtained through thermal treatment at 450° C. for 1 hour after thermal compression. Such obtained NiO nanofiber has a fine porous structure, thereby greatly increasing the surface area. An oxide is formed by an entire or partial melting of the PVA through thermal compression, thereby forming an anode for a secondary battery having excellent adhesion with a lower substrate.

EXAMPLE 5

Fabrication of an NiO Nanofiber Network Through Thermocompression and Post-heating Treatment of an NiO-polyvinyl Alcohol Composite Fiber Layer 1.5 g of polyvinyl alcohol (PVA, Mw: 88,000) was dissolved in 15 g of DI water. 1 g of Ni acetate was dissolved in 2 g of DI water. A transparent green solution could be obtained after stirring a mixture of the two solutions for several minutes.

After this mixed solution was transferred into a syringe and mounted on the electrospinning device, an Ni acetate-PVA organic/inorganic composite fiber layer could be obtained on a substrate through electrospinning (applied voltage: 18 kV, flow rate: 28 µl/min, amount of fiber fabricated: 500 µl, substrate: SUS, distance between the tip and collector: 8 cm).

The obtained fiber was pressed using a lamination machine (120° C., pressure: 1.5 Kgf/cm$^2$, time: 5 minutes) and again was sintered at 450° C. for 1 hour to obtain NiO nanofibers. Here, it was noted that the surface structure was changed according to the degree of pressure applied. Also, the thermal pressurization temperature could be differently set according to the polymers to be used. While the nickel chloride precursor was used to form the NiO nanofiber network in the previous Example 4, nickel acetate was used to form the NiO nanofiber network in Example 5, resulting in obtaining a similar structure.

As so far described, there are various types of metal oxides and polymers usable to obtain nanofiber network structures including nano-rods, nano-grains, and nano-particles, the present invention is not limited to a particular material (precursor or polymer).

The foregoing embodiments and advantages are merely exemplary and are not to be construed as limiting the present invention. Many alternatives, modifications, and variations will be apparent to those skilled in the art.

EFFECT OF THE INVENTION

Since a metal oxide fabricated as a negative active material by the method of the present invention has a linear (one dimensional) network structure of nano-fibers composed of ultrafine nano-grains and/or nano-rods, the metal oxide has a highly increased surface area and meso pores, and has a high endurance to volume change. Accordingly, the charge/discharge efficiency of a battery is enhanced, and in particular, the rate performance is highly enhanced to output at a high speed, thereby being useful as a negative active material of a high capacity/high output battery.

In addition, adhesion between a collector and the negative active material can be greatly enhanced through thermal compression or thermal pressurization, and the thickness of the negative active material can be easily adjusted by controlling the spinning time.

The invention claimed is:

1. An anode for a secondary battery, comprising:
   an anode collector; and
   a negative active material compressed on at least one surface of the collector and being a thin porous metal oxide layer with a tangled web structure of nano-fibers composed of at least one of nano-grains, nano-rods, and nano-particles.

2. The anode for a secondary battery of claim 1, wherein an average diameter of the nano-fibers is 10-600 nm, and an average size of the nano-grains, nano-rods, and nano-particles is 5-100 nm.

3. The anode for a secondary battery of claim 1, wherein pores having an average size of 1-100 nm are formed between the nano-grains and between the nano-rods and between the nano-particles.

4. The anode for a secondary battery of claim 1, wherein the collector is formed of (1) a material selected from a group of Pt, Au, Pd, Ir, Ag, Rh, Ru, Ni, stainless steel, Al, Mo, Cr, Cu and W, or (2) ITO (In doped SnO$_2$) or FTO (F doped SnO$_2$), or (3) a metallic material formed on an Si wafer.

5. The anode for a secondary battery of claim 1, wherein the metal oxide is one selected from a group of SnO$_2$, TiO$_2$, Fe$_2$O$_3$, Fe$_3$O$_4$, CoO, Co$_3$O$_4$, CuO, ZnO, In$_2$O$_3$, NiO, MoO$_3$ and WO$_3$.

6. A secondary battery, comprising:
   an anode having an anode collector and a negative active material compressed on at least one surface of the collector;
   an electrolyte; and
   a cathode,
   wherein the negative active material is a thin porous metal oxide layer with a tangled web structure of nano-fibers composed of at least one of nano-grains, nano-rods, and nano-particles.

* * * * *